United States Patent [19]

Gottelt

[11] 4,043,695

[45] Aug. 23, 1977

[54] METHOD OF BOTTLE BORING

[75] Inventor: Herbert R. Gottelt, Mount Prospect, Ill.

[73] Assignee: Alco Standard Corporation, Valley Forge, Pa.

[21] Appl. No.: 493,787

[22] Filed: Aug. 1, 1974

Related U.S. Application Data

[62] Division of Ser. No. 337,671, March 2, 1973, Pat. No. 3,854,839.

[51] Int. Cl.$^2$ .............................................. B23B 35/00
[52] U.S. Cl. .................................... 408/1 R; 408/129; 408/159
[58] Field of Search .................... 408/1, 80, 159, 709, 408/124, 129, 57, 77, 78, 83, 85, 86, 157, 180; 145/124

[56] References Cited

U.S. PATENT DOCUMENTS

| | | | |
|---|---|---|---|
| 599,655 | 2/1898 | Huben | 145/124 X |
| 1,183,450 | 5/1916 | Hammann | 408/159 |
| 2,009,822 | 7/1935 | Thorsen | 408/209 |
| 2,236,944 | 4/1941 | Gerardi | 408/159 X |
| 2,333,589 | 11/1943 | Schauer | 408/77 X |
| 2,391,794 | 12/1945 | O'Brien, Jr. | 408/57 |
| 3,469,474 | 9/1969 | Wagner | 408/124 |

Primary Examiner—Othell M. Simpson
Assistant Examiner—Z. R. Bilinsky
Attorney, Agent, or Firm—Haight, Hofeldt, Davis & Jambor

[57] ABSTRACT

An apparatus for enlarging the diameter of an existing bore within a turbine shaft or the like along a desired linear portion of the shaft having a boring head mounted on a drive shaft for rotation therewith after insertion within the existing bore. The boring head has a pair of opposed matable cutting tool means pivotally mounted within it which are radically advanced or retracted toward or away from the walls of the existing bore by operation of a cam assembly also mounted in the boring head for axial movement therealong and engaging an end of the tool means opposite the cutting head. The cam assembly is mounted for movement on a threaded transmission member which is rotated to move the cam assembly by an adjustment shaft positioned for calibrated angular movement within an interior passageway formed in the drive shaft. The boring assembly is rotated for cutting by a drive means engaging the exterior surface of the drive shaft and is linearly moved within the turbine shaft by a driven feed table.

3 Claims, 7 Drawing Figures

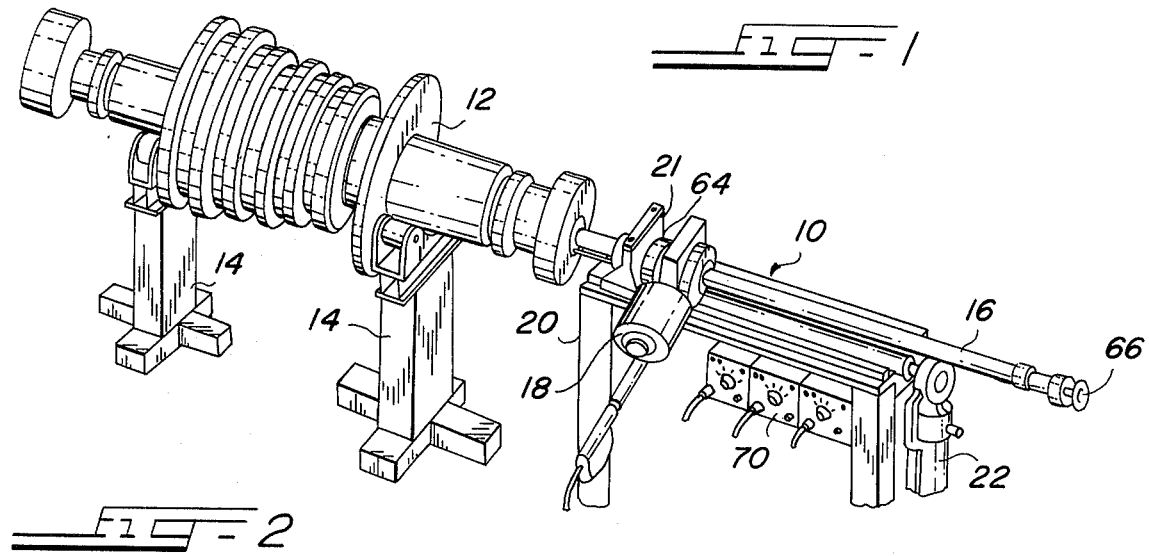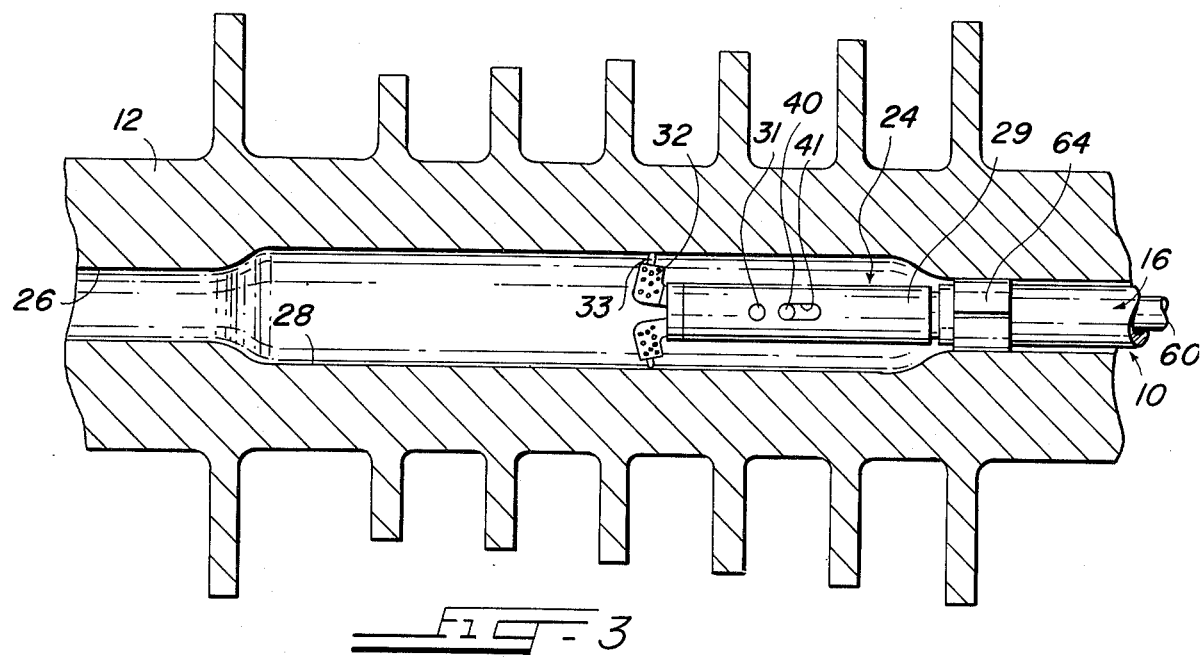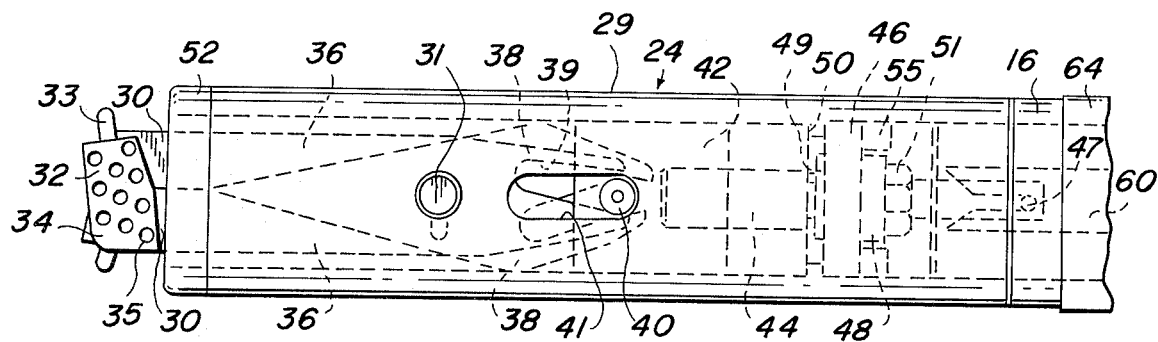

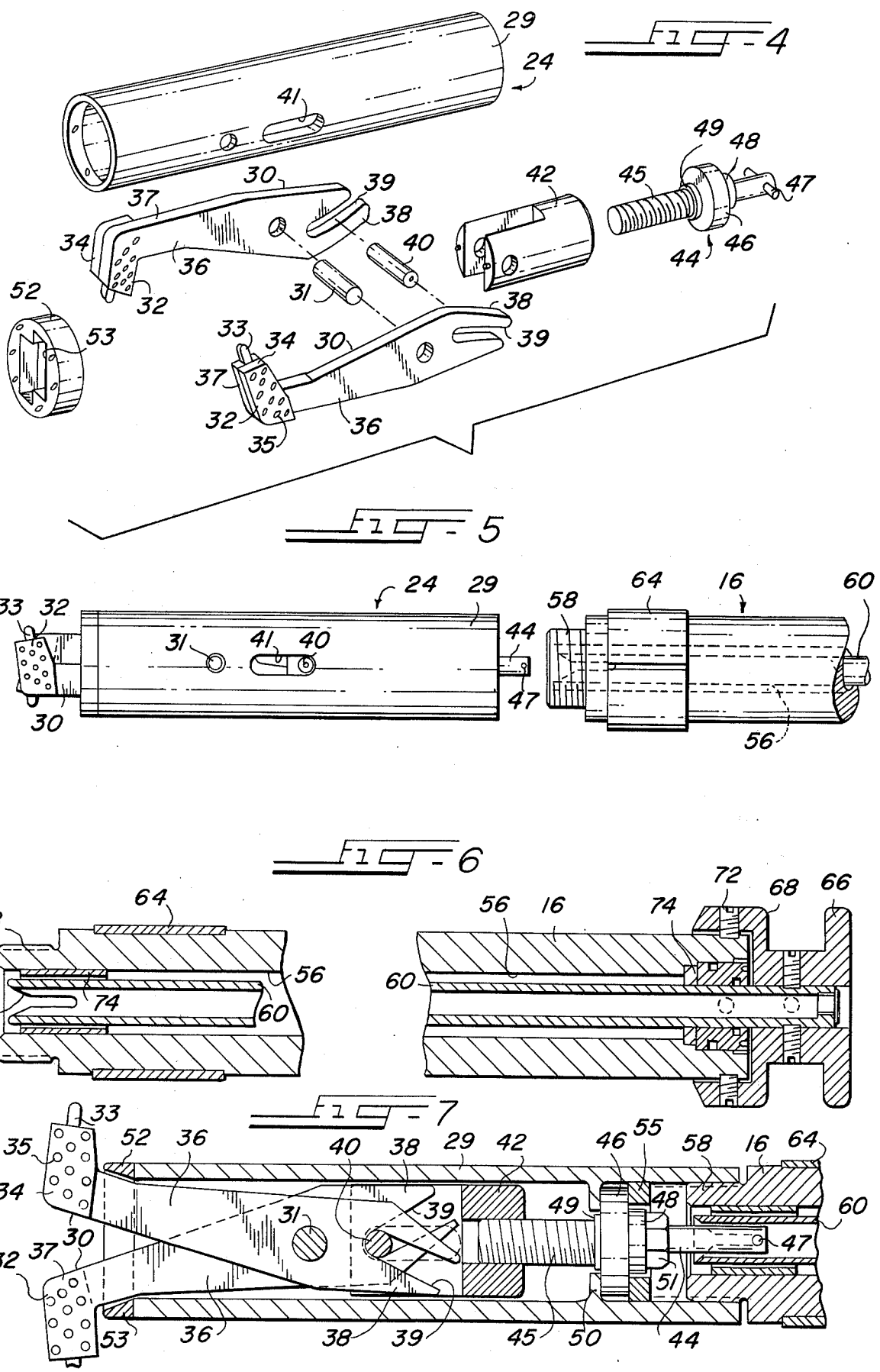

METHOD OF BOTTLE BORING

This is a division, of application Ser. No. 337,671, filed Mar. 2, 1973 now U.S. Pat. No. 3,854,839.

BACKGROUND OF THE INVENTION

This invention relates to a boring apparatus in general, and, in particular, to an apparatus for enlarging the diameter of an existing bore within the interior of a turbine shaft or the like.

The existence of stress risers or stress points in the vicinity of the center line of turbine or other shafts used in high-power applications such as hydroelectric plants and the like has long presented a problem to engineers and manufacturers. These built-in stress risers and stress points are inclusions and impurities introduced into the shaft at the time it is manufactured or formed. Since it is desirable, and often necessary, to eliminate or at least reduce the number of stress risers or stress points formed in the shafts, an attempt has been made to accomplish this by drilling a three to four inch diameter hole along the central axis of the turbine shaft. This hole, in addition to removing all the material along its length would also remove these inclusions.

Such a procedure was considered to be adequate until recently when the fast-developing field of nuclear density testing was applied to testing the soundness of such drilled turbine shafts. Unfortunately, it was discovered that a number of stress points usually remained in the shafts close to the center hole, despite the opening of the three or four inch bore.

It is not yet known with certainty in the industry whether these small inclusions or cracks propagate with time, as expected, because of the lack of previous test data. However, because of the expense and potential danger involved in failure of a turbine shaft while in operation in a large scale utility or the like, it has been considered extremely desirable to eliminate, if possible, the number of these stress points. The problem with so doing would be that boring a larger diameter hole uniformly from one end of the shaft to another end of the shaft would severely reduce the strength of the shaft at the ends. It would be ideal, therefore, to "bottle bore" the shaft, that is, to enlarge an existing three or four inch bore to a larger diameter along a selected portion of the interior length of the shaft, while tapering back to the diameter of the existing bore near each end. There is no presently existing equipment in the industry, however, which can accomplish this type of bottle bore to the dimensions necessary. No prior apparatus or method will allow expansion of the interior diameter to more than twice the width of the tool head. Moreover, prior apparatus, such as lathes, are not portable and require turning of the entire turbine to accomplish boring.

DESCRIPTION OF THE INVENTION

The present invention is directed to a bottle boring apparatus which may be inserted into an existing bore of a turbine shaft and moved axially along the shaft as the boring head blades are advanced outwardly to open up an existing bore to any practical diameter limited only by the weakening of the shaft itself and the reduction of the safety factor. This invention overcomes the disadvantages of the prior art and accomplishes bottle boring to any desired diameter by a boring head which is mounted on and rotated with a boring drive shaft. The sleeve-like boring head has a pair of opposed matable tool holding members pivotally mounted within it having guided boring head blades mounted on their forward ends and having curved or straight cam follower slots formed in their rearward ends.

A cam pin is mounted in slots formed in the walls of the boring head to allow axial movement along the central axis of the boring head. This cam pin engages the oppositely angled slots on each of the tool members and acts on the slope of curve of the slots, as it is moved, to pivot the members about their pivot point within the boring head and thereby radially advance or retract the cutting blades relative to the boring head. The cam pin is held by a yoke which moves along the threads of a transmission screw mounted in a stationary position within the boring head. The transmission screw is turned, resulting in linear movement of the cam pin, by a torque tube positioned inside an interior passageway formed in the boring drive shaft. The forward end of the torque tube has slots formed in it which engage a cross-pin at the rearward end of the transmission screw.

The torque tube extends the length of the boring drive shaft and is rotatable relative to the boring drive shaft by a calibrated disc mounted on its rearward end. This disc is calibrated to indicate accurately movement of the tool head members in thousandths of an inch.

This invention allows the cutting blades to be positively set for deep cuts and alternatively, to be retracted to remove the boring bar and head through the neck of the bottle to clean out chips. The boring head may be reinserted and reset to the same or a deeper cut to insure repeatedly accurate results.

The hollow torque tube may be used to introduce compressed air and cooling fluid into the apparatus to keep the working parts of the boring head clear of chips and to cool the tool blades and aid in obtaining a good machined finish. The boring head blades and tool members are designed to support themselves in right hand rotation and prevent tool clatter. The scissor-like action of the blades prevents side loads and aids in maintaining a true, round and concentric bore.

Accordingly, it is an object of this invention to provide a bottle boring apparatus which is simple in construction and operation and completely portable, yet achieves completely reliable and effective results.

It is a further object of this invention to provide a bottle boring apparatus which may be inserted into the interior of an existing bore of a turbine shaft and may be selectively controlled in its operation to effectively and efficiently enlarge the existing bore to any diameter desired to eliminate stress risers and stress points.

It is another object of this invention to provide a bottle boring apparatus which may be effectively used to bore a distance sufficient to bottle bore a turbine shaft.

It is a still further object of this invention to provide a bottle boring apparatus which accomplishes, simultaneously, both linear and radial advance of the cutting blades.

It is still another object of this invention to provide a bottle boring apparatus which allows precise and accurate radial adjustment of the cutting blades by a means exterior to the interior of the turbine shaft.

It is one more object of this invention to provide a bottle boring apparatus which allows for the introduction of a flushing and cooling fluid into the bore during the boring operation.

It is still one more object of this invention to provide a bottle boring apparatus which is rugged in construction and precise in operation having closely guided boring head blades to prevent tool clatter and a scissor-like action of the blades to prevent side loads and aid in maintaining a true, round and concentric bore.

These and other important objects of this invention will become apparent from the following description taken in conjunction with the drawings illustrating a preferred embodiment wherein:

FIG. 1 is a perspective view of the bottle boring apparatus of this invention being used to enlarge the existing bore of a turbine shaft;

FIG. 2 is a cross sectional elevational view taken through the conventional turbine shaft shown in FIG. 1 of the boring head of the bottle boring apparatus of this invention in operation within the shaft;

FIG. 3 is a side elevational view of the boring head shown in FIG. 2 in non-boring position, showing, in hidden lines, the cam assembly and cutting tool members disposed within the boring head;

FIG. 4 is an exploded view of the boring head shown in FIG. 3;

FIG. 5 is a side elevational view of the bottle boring head and a forward fragment of the drive shaft of the bottle boring apparatus of this invention showing the means for operative engagement between them;

FIG. 6 is a side cross-sectional view of the drive shaft of the bottle boring apparatus of this invention shown in FIG. 1; and, FIG. 7 is a side cross-sectional view of the boring head of the bottle boring apparatus of this invention in boring position as shown in FIG. 2.

Referring now to the drawings, and, in particular to FIG. 1, the bottle boring apparatus of this invention is shown generally at 10. This bottle boring apparatus 10 is shown in actual boring position within a turbine shaft 12 which is supported by stands 14 in position for the boring operation. The boring apparatus 10 includes a boring bar or boring drive shaft 16 which is rotated about its central axis at a desired angular speed by a boring bar drive means 18. The boring drive shaft 16 and the entire boring apparatus 10 is supported on a saddle 21 mounted for linear movement along a feed table 20. Movement of the saddle 21 along the feed table 20, and thus movement of the boring apparatus 10 into the existing bore of the turbine shaft 12 is accomplished by a feed table drive means 22. The action of the boring bar drive means 18 and feed table drive means 22 are controlled and correlated by electronic control means 70 mounted under the feed table 20.

The bottle boring apparatus 10 also includes a boring head 24 mounted on the forward end of boring drive shaft 16 for rotation with drive shaft 16. The bottle boring apparatus 10 is movable into and out of the existing bore 26 of the turbine shaft 12 to form a bottle bore 28, as shown in FIG. 2, of the length desired, by the assembly including the feed table 20 shown in FIG. 1, as will be described in detail below.

The boring head 24 includes an outer hollow, generally cylindrical sleeve or shell 29 which is open at its opposite ends. A pair of cutting tool members 30 are pivotally mounted within shell 29 on a pivot pin 31 which is disposed generally transversely to the central axis of the shell 29 at approximately the midline of the shell. The cutting tool members 30 each have a forward cutting blade portion 32 which includes a replaceable cutting bit 33 which engages the interior wall of the turbine shaft 12 to perform the actual cutting. This bit 33 is clamped in place by a removable holding plate 34 joined to a clamp plate 37 of the tool member 30 by a number of fasteners 35 which are disposed to the outside of the bit 33. The cutting tool member 30 also has a cam follower portion 38 at its rearward end. The blade portion 32 and cam follower portion 38 are joined by a tool arm 36. The cutting tool member 30 is preferably integrally formed from materials which will be discussed in detail below.

The cam follower portion 38 of the cutting tool member 30 has a cam follower slot 39 formed in it which is open at one end and which receives, for sliding movement therein, a cam pin 40. The cam follower slots 39 are generally curvilinear in shape having approximately a 3 inch radius. The slots 39 may also be formed straight rather than curved, however, the curved slot permits linear advancement of the cutting blade portion 32, as will be explained below.

The two cutting tool members 30 are oppositely positioned, similar to the members of a scissors, with their curved or straight slots 39 bending in generally opposite directions from the horizontal. The cam pin 40 is positioned generally transversely to the cental axis of the sleeve 29 and rides in corresponding elongated pin mounting and travel slots 41 formed in the opposite walls of the sleeve 29. The cam pin 40 is also positioned so that it rides in the cam follower slots 39 formed in the cam follower portion 38 of each tool member 30. It is easily seen, in FIGS. 3, 5 and 8 that as the cam pin 40 is moved toward the forward end, i.e., the cutting blade portion 32, of the boring head 24, it will move axially along slot 41 and within movable cam follower slots 39, causing the tool members 30 to be pivoted about pivot point pin 31 in opposite directions. As this happens, the tool members 30, because of their reversed construction will have their cutting blade portions 32 moved radially outwardly toward the interior surface of the turbine shaft to be bored.

The cam pin 40 is mounted between forwardly extending members of a yoke 42. The opposite end of the yoke 42 has a threaded bore to threadedly engage a forward threaded portion of a transmission bar 44. The transmission bar 44 is maintained in a stationary axial position within the sleeve 29 by a bearing containment ring 46 disposed near its mid-portion, which is brought to bear on an annular, inwardly extending shoulder 50 formed within the sleeve 29, upon assembly of the bearing apparatus 10. The transmission bar 44 is mounted and rotates freely within thrust bearings 48 and 49 interiorly engaging containment ring 46 and mounted between a stepdown shoulder on bar 44 and a retaining nut 51 to prevent any axial movement of bearings 48 and 49 on bar 44. Containment ring 46 is prevented from axial movement by stop ring 55 threaded into sleeve 29 to a position adjacent it. The rearward end of the transmission bar 44 has a cross pin 47 disposed through it which is used to engage a means for adjusting the cutting diameter of the boring head mounted in the boring drive shaft 16, as will be explained below.

A sleeve cap 52 is positioned over the forward end of the sleeve 29. This cap 52 has a pair of adjacent blade guide slots 53 formed in its face which allow radial movement of the cutting tool members 30. These slots 53 are open to one another across their center portion, as shown in FIG. 4, to accomodate a width approximately equal to the width of both cutting tool members 30, while at their outward end portions, each guide slot 53 will only accomodate the width of a single tool member to aid in supporting this tool member during the cutting operation. One of the unique advantages of the present invention is that the blade portions 32 of tool members 30 are so disposed within the guide slots 53 in cap 52 that when the boring head 24 is rotated in a right-hand or clockwise direction, the blade portions 32 act to support themselves. The scissor-like action of the tool members 30 prevents the adverse affects of side loads and the supporting guide slots 53 prevent excessive play between tool members 30 and tool clatter. Both advantages aid in maintaining a true, round and concentric bore.

The boring head 24 is mounted on the boring drive shaft 16 by threadedly engaging an interior threaded, rear portion of the sleeve 29 by an exterior threaded, reduced diameter portion of the drive shaft 16, as shown in FIG. 5. This coupling is threaded in a direction, preferably right-hand, so that when the drive shaft 16, and boring head 24 mounted on it, are rotated in a clockwise direction, the threaded connection between the two will not be loosened.

The boring drive shaft 16 has an interior hollow passageway 56 formed along its length as shown in FIGS. 5 and 6. A hollow torque tube 60, slightly shorter than the drive shaft 16, is inserted into and along passageway 56. This torque tube is open at its opposite ends and has a slot 62 formed in the forward end adjacent the boring head 24 to receive the cross pin 47 mounted on the transmission bar 44. The sides forming slot 62 diverge at the open, forward end of torque tube 60 and to aid in aligning the cross pin 47 within the slot. The slot 62 is of sufficient length to allow the cross pin to be inserted within it a sufficient distance to permit the threaded portion 58 of the drive shaft 16, to be completely threaded into the boring head 24. In this position, the rotation of the drive shaft 16 about its central axis will cause rotation of the boring head 24 about the same central axis while the transmission bar 44 is maintained in a stationary position within the boring head 24.

The boring drive shaft 16 may be formed in any length desired or necessary, depending upon the length of bore which is to be made. Disposed at selected points about the exterior surface of the drive shaft 16, as shown in FIGS. 2 and 5, are a plurality of outer drive shaft bearings 64 which support the boring bar 16 within the turbine shaft 12. These bearings are preferably made of a material such as that sold under the trademark "TEFLON" by DuPont, which is resistant to heat and abrasion and reduces friction between the metal surfaces.

The boring drive shaft or boring bar 16 has, at its extreme rearward end, opposite the boring head 24, a novel calibration disc 66 which is preferably integrally formed as part of a thrust collar 68 movably mounted over the outside of the rearward end of the drive shaft 16, by adjustable set screws 72 or the like, as shown in FIG. 6. Collar 68 thrusts against the end of the boring drive shaft 16 and engages the end of torque tube 60 positioned in passageway 56. By adjusting the thrusting force of collar 68 against the boring bar 16, the collar may be turned to rotate torque tube 60 to a selected angular distance relative to boring bar 16. The set screws 72 may then be re-tightened on boring drive shaft 16 when a desired degree of rotation has been obtained, as will be explained below. The angular movement of torque tube 60 relative to boring bar 16 is aided by interior sleeve bearings 74 within passageway 56. These sleeve bearings 74 also act to center the torque tube and to prevent its lateral movement. The collar 68 serves to prevent any axial movement of the torque tube.

The calibration disc 66, which is formed as a part of the collar 68, is preferably calibrated in standard units of measure, such as thousandths of an inch, corresponding to the radial advancement of the cutting blade portions 32 of tool members 30. When the collar 68 is rotated relative to the boring drive shaft 16, it acts to rotate the torque tube 60 a like angular distance. Since the torque tube 60 engages the cross pin 47 which is mounted on the transmission bar 44, the transmission bar will also be rotated. The transmission bar 44 is maintained in a stationary axial position, relative to shell 29 so that the angular movement of bar 44 caused by rotation of the torque tube 60, is translated into axial movement of the yoke 42 and the cam pin 40 relative to bar 44 and shell 29, since these are the only elements free to move axially within shell 29. Thus, as torque tube 60 and transmission bar 44 are rotated, the yoke 42 will be moved axially along the threaded portion 45 of the transmission bar 44, thereby moving the cam pin 40 axially in the elongated slots 41. As cam pin 40 moves in slots 41, cam follower slots 39 formed in the cutting tool members 30, likewise move on it, causing tool members 30 to be pivoted about pivot point 31 and either radially extended or retracted.

It has been found that the use of a curvelinear cam follower slot 39, on a radius of approximately 3 inches, will permit a direct linear correlation between the angular movement of the calibration disc 66 on the thrust collar 68 and the radial movement of the cutting tool members 30. Thus, it is possible to precisely set a desired boring diameter of the cutting tool members 30 of the boring head 24, even though the boring head 24 is completely disposed within a turbine shaft 12, from outside of the turbine shaft, with complete confidence and assurance of accurate and repeatable results.

The hollow torque tube 60 opens through the disc 66 on the collar 68 in the form of a standard fitting for attachment to a compressed air or cooling fluid line. These fluids may be pumped along the length of the torque tube 60 and through the boring head 24 to keep the working parts of the boring head clear of chips and to cool the tool bits and aid in maintaining a good machined finish.

The boring drive shaft 16 may be driven by a commercially-available portable power drive device 18, such as a No. 68 Power Drive manufactured by Toledo-Beaver Tools of Toledo, Ohio. This power drive 18 is fitted with a special drive adapter which is clamped over the exterior circumferential surface of the boring drive shaft 16, as shown in FIG. 1, and tightened. The drive adapter will fit directly over on the shaft 16 to engage it and has not been found to slip. Alternatively, a key way could be formed in the bar 16 to which the adapter could be locked. This power drive 18, and the bottle boring drive shaft 16, are mounted on a saddle 21 which moves laterally along the feed table 20 to advance the boring head 24 and drive shaft 16 axially into the turbine shaft. A series of outer bearings 64 support drive shaft 16 and ultimately the entire boring apparatus 10 on the saddle 21.

The feed table 20 may be a standard, manual feed table having a hand wheel disposed at one end. The hand wheel, however, is preferably replaced with an adapter which may be rotated by a feed drive motor 22, such as the Ridgid No. 700 Power Drive, as shown in FIG. 1. Through the electronic control means 70, the feed drive motor 22 is capable of an infinitely variable speed of from 0-33 rpms, which corresponds to 0-3.3 inches of lateral movement per minute. Use of a special transmission may give variable speeds of 0–132 rpms, or 0–13.2 inches per minute. The rotational drilling speed of the boring apparatus of this invention will depend, of course, on the hardness of the cutting bits 33 used. These cutting bits 33 on the cutting tool members 30 may be formed of high-speed steel for use at lower drilling speeds to permit operation of the boring head 24 at about 14 revolutions per minute or 60 suface feet per minute. On the other hand, harder cutting bits such as those formed of carbide, may be used with higher cutting speeds corresponding to up to 400 surface feet per minute.

It is clear that the above description of the drive motors and adapters as well as the angular and lateral operational speeds suggested are not intended to be limiting and are limited only by the materials used.

To illustrate the operation of the present invention, an actual example of bottle boring may be described. This example is for the purposes of illustration only and the numerical dimensions given are in no way limitations on the ability of the invention. It was found desirable, in this case, to selectively eliminate remaining inclusions and stress points in a turbine shaft by opening up an existing 3⅝ inches bore to a 6¼ inches inside diameter bore. The entire boring operation was begun by inserting the bore head 24 and a portion of the boring shaft 16 44¼ inches inside the existing bore. The existing bore was opened through a 2 inch radius on a 30° taper and blended into a 6½ inches bore by a 2 inches radius by continuous precision adjustment of the calibration disc during rotation of the boring apparatus 10 and lateral movement of the apparatus 10 on feed table 20. The 6½ inches cylindrical bore was continued for a total length of 53⅝ inches before tapering back in reverse manner at 30° through similar radii to run out into the existing 3⅝ inches bore again as shown in FIG. 2.

The present bottle boring apparatus can successfully bore to any desired length or depth of shaft required depending upon the length of the boring drive shaft 16 used. It can open up an existing bore of boring head diameter to any practical diameter, the only limiting factor being the weakening of the turbine shaft itself and reduction of the safety factor. In order to achieve larger diameter bores, the cutting tool members may be made of different lengths. The calibration dial, of course, must be calibrated differently depending upon the tool member length.

The materials suitable for use in manufacturing various elements of the boring apparatus, such as the boring head or the drive shaft should he highly resistant to shear and bending stresses and high temperatures. Such materials might consist of steel, steel alloys or various hardened metals.

While the invention has been described in relation to a preferred embodiment thereof, it will be obvious to those skilled in the art that the structure is capable of wide variation without departing from the principles of the invention.

I claim:

1. A method of bottle boring comprising:
   conveying bottle boring apparatus to the location of a stationary object having a bore:
   mounting the bottle boring apparatus adjacent an open end of the bore, with the apparatus accurately positioned with respect to the axis of the bore;
   inserting a cutting tool into an intermediate portion, which is to be enlarged, of the bore of the stationary object, while maintaining the open end portion of the bore at the original size;
   extending a boring drive shaft, which rotates the cutting tool, from the bottle boring apparatus in a cantilever fashion;
   supporting the boring drive shaft on a bearing in the portion of the bore at the original size to accurately position the cutting tool with respect to the axis of the bore at all points along the bore;
   selecting a radial position of the cutting tool at a point external to the bore, while the cutting tool is in the bore;
   controlling the radial position of the cutting tool with accuracy and precision in response to the selecting of the desired radial position thereof;
   moving the cutting tool in an axial direction through a desired length of the intermediate portion of the bore; and
   rotating the cutting tool with respect to the stationary object to selectively enlarge the intermediate portion of the bore up to more than twice the original size of the bore.

2. A method as claimed in claim 1 and further comprising the step of simultaneously inserting into the bore a second cutting tool spaced from the first cutting tool and activated in conjunction therewith.

3. A method as claimed in claim 1 and further comprising the step of gradually retracting the radial position of the cutting tool at one end of the enlarged portion of the bore to provide a tapered portion between the enlarged intermediate portion and the original sized end portion of the bore.

* * * * *